(12) United States Patent
Ponikiewski et al.

(10) Patent No.: US 11,866,088 B2
(45) Date of Patent: Jan. 9, 2024

(54) STEERING COLUMN ASSEMBLY FOR A VEHICLE

(71) Applicant: ZF Steering Systems Poland Sp. Z.o.o., Czechowice-Dziedzice (PL)

(72) Inventors: Pawel Ponikiewski, Pewel Mala (PL); Damian Uchyla, Strumień (PL); Artur Wojtalik, Katowice (PL); Radoslaw Szymoszek, Cieszyn (PL); Marcin Brzoska, Zabrzeg (PL)

(73) Assignee: ZF Steering Systems Poland Sp.Z.o.o, Czechowice-Dziedzic (PL)

( * ) Notice: Subject to any disclaimer, the term of this patent is extended or adjusted under 35 U.S.C. 154(b) by 0 days.

(21) Appl. No.: 17/948,300

(22) Filed: Sep. 20, 2022

(65) Prior Publication Data
US 2023/0090642 A1 Mar. 23, 2023

(30) Foreign Application Priority Data

Sep. 22, 2021 (EP) ..................................... 21461596
Oct. 19, 2021 (GB) ..................................... 2114956

(51) Int. Cl.
*B62D 1/181* (2006.01)
*B62D 1/185* (2006.01)

(52) U.S. Cl.
CPC ............. *B62D 1/181* (2013.01); *B62D 1/185* (2013.01)

(58) Field of Classification Search
CPC ......... B62D 1/181; B62D 1/185; B62D 1/183
See application file for complete search history.

(56) References Cited

U.S. PATENT DOCUMENTS

| 5,036,720 A | * | 8/1991 | Shirasawa | B62D 1/181 74/89.42 |
| 5,178,411 A | * | 1/1993 | Fevre | B62D 1/181 280/775 |

(Continued)

FOREIGN PATENT DOCUMENTS

| CN | 104661696 A | * | 5/2015 | ............. A61M 5/24 |
| CN | 105658264 A | * | 6/2016 | ............. A61M 5/20 |

(Continued)

*Primary Examiner* — Drew J Brown
(74) *Attorney, Agent, or Firm* — Kristin L. Murphy (57) ABSTRACT

A steering column assembly comprises: a housing having outer, intermediate and inner elongate, telescopically mounted housing portions movable relative to one another along an adjustment axis; a steering column rotatably mounted in the inner elongate housing portion and being configured at one end for attachment of a steering member (e.g. a steering wheel); a leadscrew rotatably mounted on one of the inner and outer housing portions and having first and second threaded portions which overlap each other for at least part of the length of the leadscrew; a motor for rotating the leadscrew; a first displacement member screw-threadedly mounted to the first threaded portion of the leadscrew and connected to the outer or inner elongate housing portion on which the leadscrew is not rotatably mounted; and a second displacement member screw-threadedly mounted to the second threaded portion of the leadscrew and connected to the intermediate housing portion. Rotation of the leadscrew causes displacement of the first and second displacement members along the adjustment axis.

17 Claims, 7 Drawing Sheets

(56) References Cited

U.S. PATENT DOCUMENTS

| | | | |
|---|---|---|---|
| 5,911,789 A | 6/1999 | Keipert et al. | |
| 6,079,743 A * | 6/2000 | Grams | B62D 1/181 |
| | | | 280/775 |
| 6,142,523 A * | 11/2000 | Bathis | B62D 1/181 |
| | | | 280/777 |
| 7,159,904 B2 * | 1/2007 | Schafer | B62D 1/181 |
| | | | 280/775 |
| 8,161,839 B2 * | 4/2012 | Warashina | B62D 1/181 |
| | | | 74/493 |
| 9,260,130 B2 * | 2/2016 | Mizuno | B62D 1/187 |
| 10,189,496 B2 * | 1/2019 | King | B62D 1/184 |
| 10,228,047 B2 * | 3/2019 | Nunez | F16H 25/20 |
| 10,577,010 B2 * | 3/2020 | Derocher | B62D 1/183 |
| 2006/0283281 A1 | 12/2006 | Li et al. | |
| 2007/0137381 A1 * | 6/2007 | Arihara | B62D 1/181 |
| | | | 280/775 |
| 2016/0045664 A1 * | 2/2016 | Morris | A61M 5/31585 |
| | | | 604/207 |
| 2017/0097071 A1 | 4/2017 | Galehr | |
| 2017/0363189 A1 * | 12/2017 | Nunez | F16H 25/2006 |
| 2019/0210633 A1 * | 7/2019 | Derocher | B62D 1/181 |
| 2021/0061340 A1 * | 3/2021 | Wilkes | B62D 1/185 |
| 2022/0324505 A1 * | 10/2022 | Ku | B62D 1/185 |

FOREIGN PATENT DOCUMENTS

| | | | | |
|---|---|---|---|---|
| DE | 102017126198 A1 * | 5/2019 | | G01B 5/0002 |
| DE | 102018217960 A1 | 4/2020 | | |
| DE | 102020117447 B3 | 4/2021 | | |
| JP | 2021020549 A | 2/2021 | | |
| WO | 2021172865 A1 | 9/2021 | | |

\* cited by examiner

STEERING COLUMN ASSEMBLY FOR A VEHICLE

CROSS-REFERENCE TO RELATED APPLICATION

This application claims priority to European Patent Application No. 21461596.5, filed Sep. 22, 2021 and GB Patent Application No. 2114956.2, filed Oct. 19, 2021, the disclosures of which are incorporated herein by reference in their entirety.

TECHNICAL FIELD

The present disclosure relates to steering column assemblies for motor vehicles and in particular, but not exclusively, to retractable steering column assemblies for autonomous vehicles.

BACKGROUND

Autonomous vehicles are intended to be used primarily in autonomous mode, in which control of the vehicle is carried out without manual intervention. However, it is desirable for autonomous vehicles to be controllable manually if necessary or desired, and for that reason vehicle controls such as a steering wheel (typically having a "steer-by-wire" operation) must be provided. It is desirable for the steering wheel of such autonomous vehicles to be moved into a stowed condition during autonomous control of the vehicle in order to maximise the space available within the vehicle and for the steering wheel to be moved into an extended, deployed condition for manual control.

In addition, when the steering wheel is in the extended, deployed condition it is desirable to be able to adjust the position of the steering wheel for the comfort and safety of the driver.

SUMMARY

In accordance with the present disclosure, a steering column assembly comprises:

a housing having outer, intermediate and inner elongate, telescopically mounted housing portions movable relative to one another along an adjustment axis;

a steering column rotatably mounted in the inner elongate housing portion and being configured at one end for attachment of a steering member;

a leadscrew rotatably mounted on one of the inner and outer housing portions and having first and second threaded portions which overlap each other for at least part of the length of the leadscrew;

a motor for rotating the leadscrew;

a first displacement member screw-threadedly mounted to the first threaded portion of the leadscrew and connected to the outer or inner elongate housing portion on which the leadscrew is not rotatably mounted; and a second displacement member screw-threadedly mounted to the second threaded portion of the leadscrew and connected to the intermediate housing portion;

whereby rotation of the leadscrew causes displacement of the first and second displacement members along the adjustment axis.

In one exemplary arrangement, the first and second threaded portions are threaded in the same direction.

In one exemplary arrangement, the first threaded portion of the leadscrew extends over substantially the whole length of the leadscrew.

Alternatively, the first threaded portion of the leadscrew may extend from one end of the leadscrew for part of the length of leadscrew and the second threaded portion of the leadscrew may extend from the other end of the leadscrew for part of the length of the leadscrew.

In one exemplary arrangement, the first displacement member comprises a first internally threaded member mounted on the first threaded portion of the leadscrew.

In one exemplary arrangement, the second displacement member comprises a second internally threaded member mounted on the second threaded portion of the leadscrew.

In one exemplary arrangement, the motor is mounted to move with the same housing portion on which the leadscrew is rotatably mounted.

The steering column assembly may further comprise a gear arrangement connecting the output of the motor to the leadscrew.

The motor may be connected to the gear arrangement and the gear arrangement may be connected to the outer or inner elongate housing portion.

In one exemplary arrangement, the leadscrew is rotatably mounted on the outer housing portion.

In one exemplary arrangement, the leadscrew is rotatably mounted on the inner housing portion.

In one exemplary arrangement, the leadscrew extends substantially parallel to the adjustment axis of the telescopic housing.

The steering column assembly may further comprise a securing arrangement for securing the outer housing portion to a vehicle.

The present disclosure also includes a vehicle comprising a steering column assembly in accordance with the present disclosure.

BRIEF DESCRIPTION OF DRAWINGS

By way of example only, specific exemplary arrangements of the present disclosure will now be described with reference to the accompanying drawings, in which:

FIGS. 5 (*a*) and (*b*) are side views of the adjustment mechanism of FIG. 2, shown in the fully retracted/withdrawn condition and fully extended/deployed condition respectively;

FIGS. 6 (*a*) and (*b*) are side views of the adjustment mechanism of FIG. 2, illustrating different mounting options for a motor.

DETAILED DESCRIPTION

A first exemplary arrangement of steering column assembly 10 for a vehicle in accordance with the present disclosure is shown in FIGS. 1 to 6. The steering column assembly 10 is telescopically adjustable along a longitudinal axis A-A which is coincident with a rotational axis of an elongate steering column 12, to an outer end 14 of which a steering wheel (omitted from the drawings for clarity) is attached in use.

Figure 1:
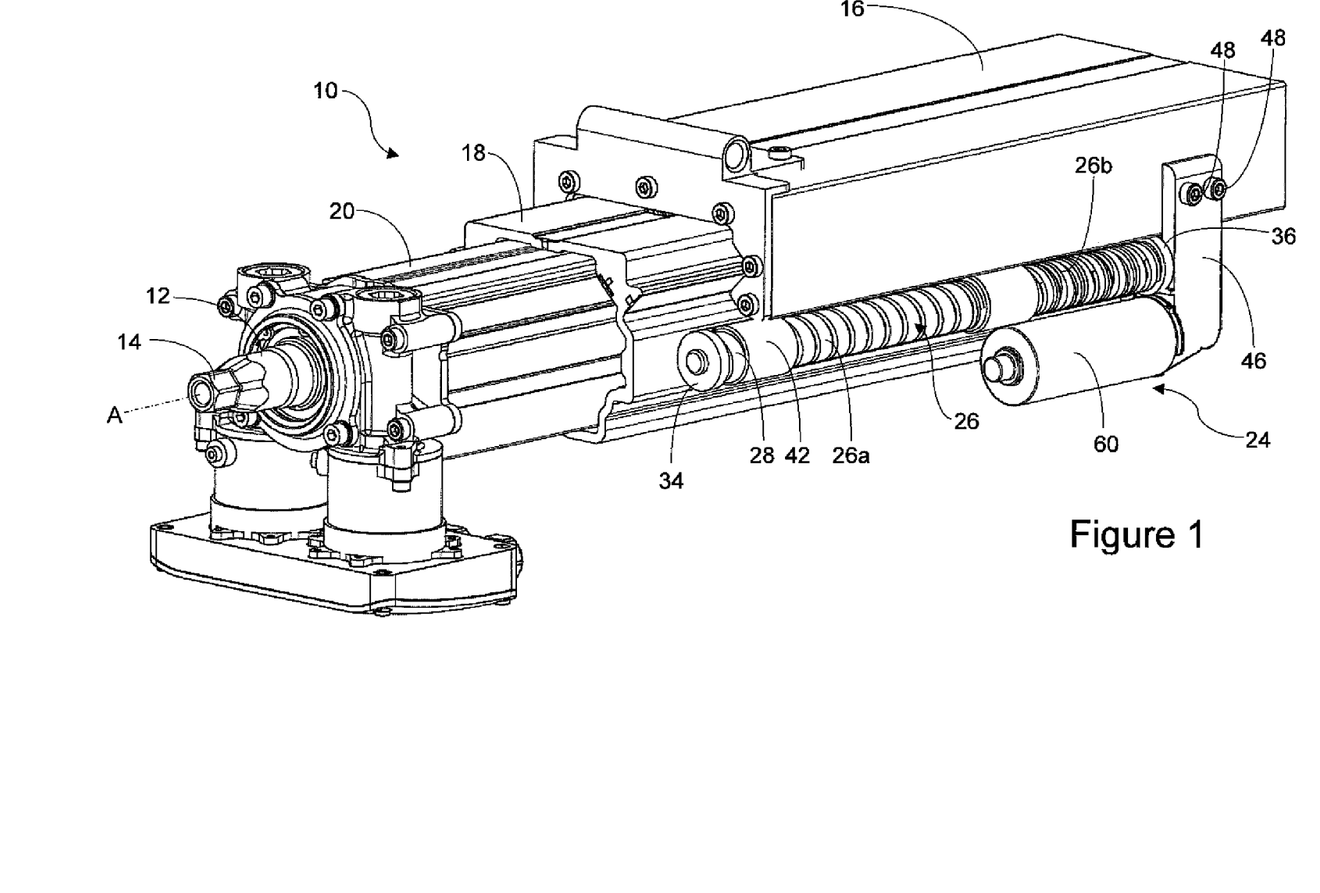
FIG. 1 is a perspective view of a first exemplary arrangement of a steering column assembly for a vehicle in accordance with the present disclosure, shown in a partially retracted condition.
Figure 2:
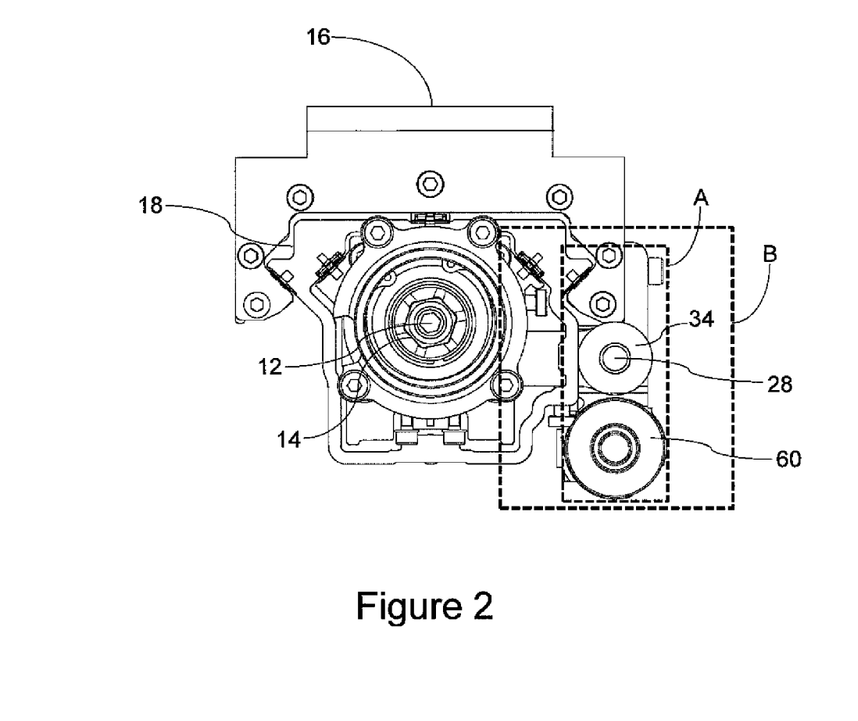
FIG. 2 is a front view of the steering column assembly of FIG. 1.
Figure 3:
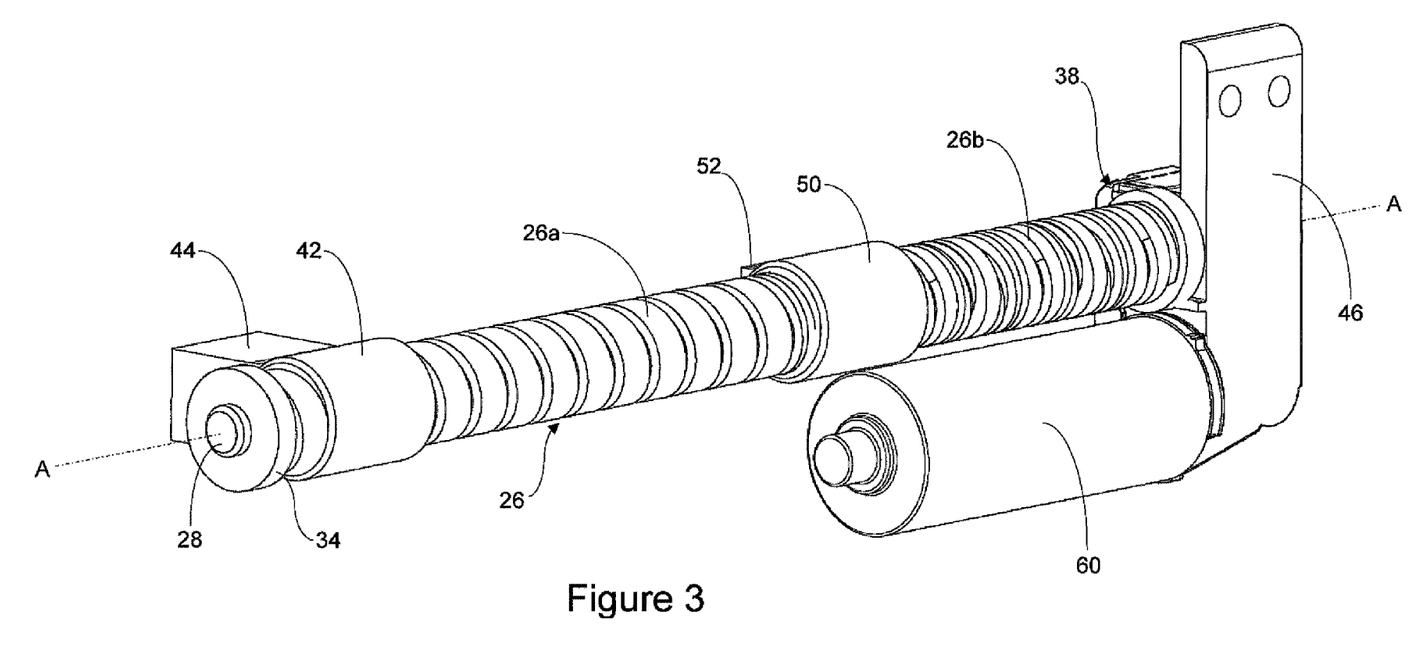
FIG. 3 is a perspective view illustrating the adjustment mechanism of the steering column assembly of FIG. 1.
Figure 4:
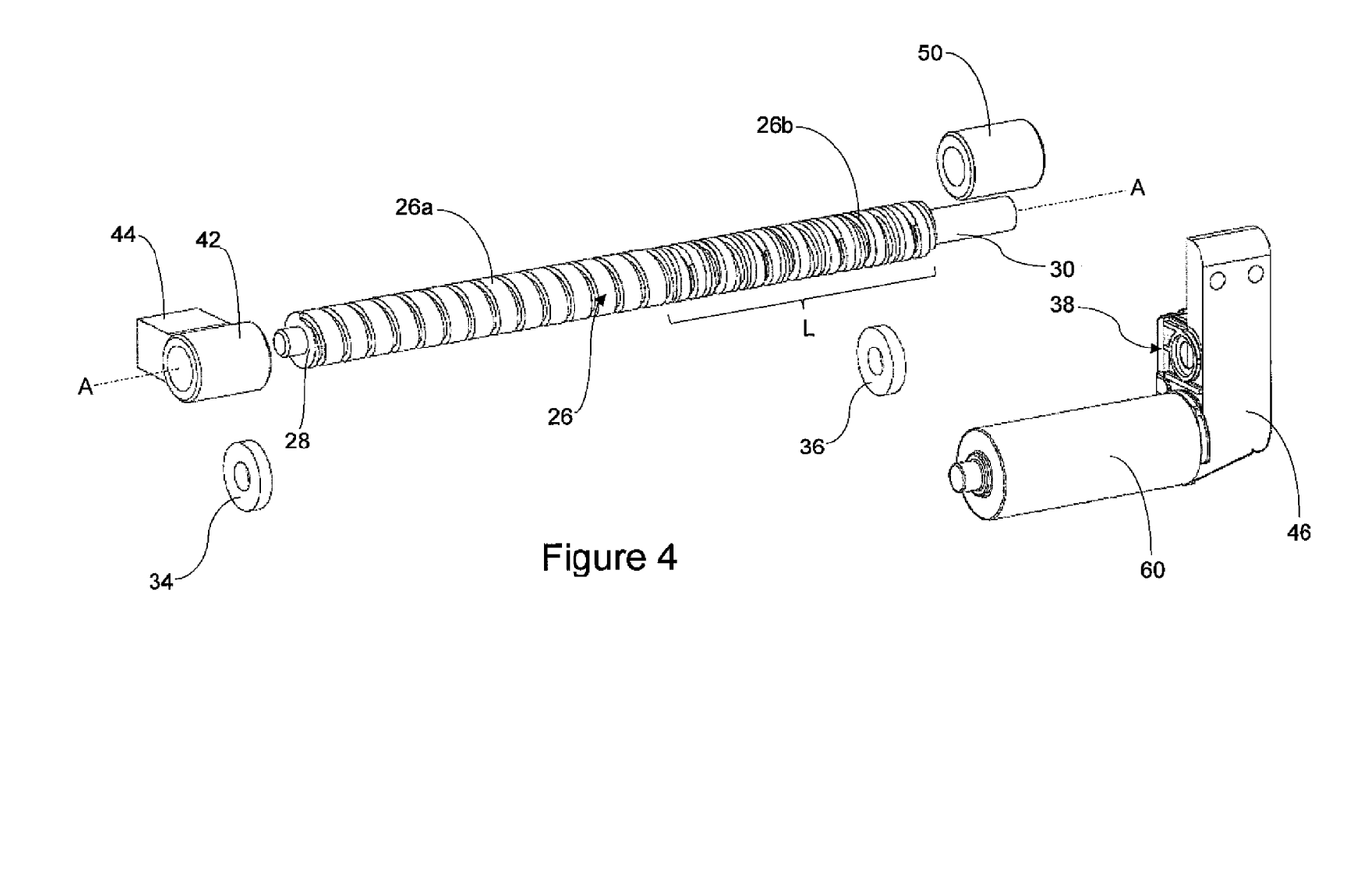
FIG. 4 is an exploded perspective view of the adjustment mechanism of FIG. 2.
Figure 5:
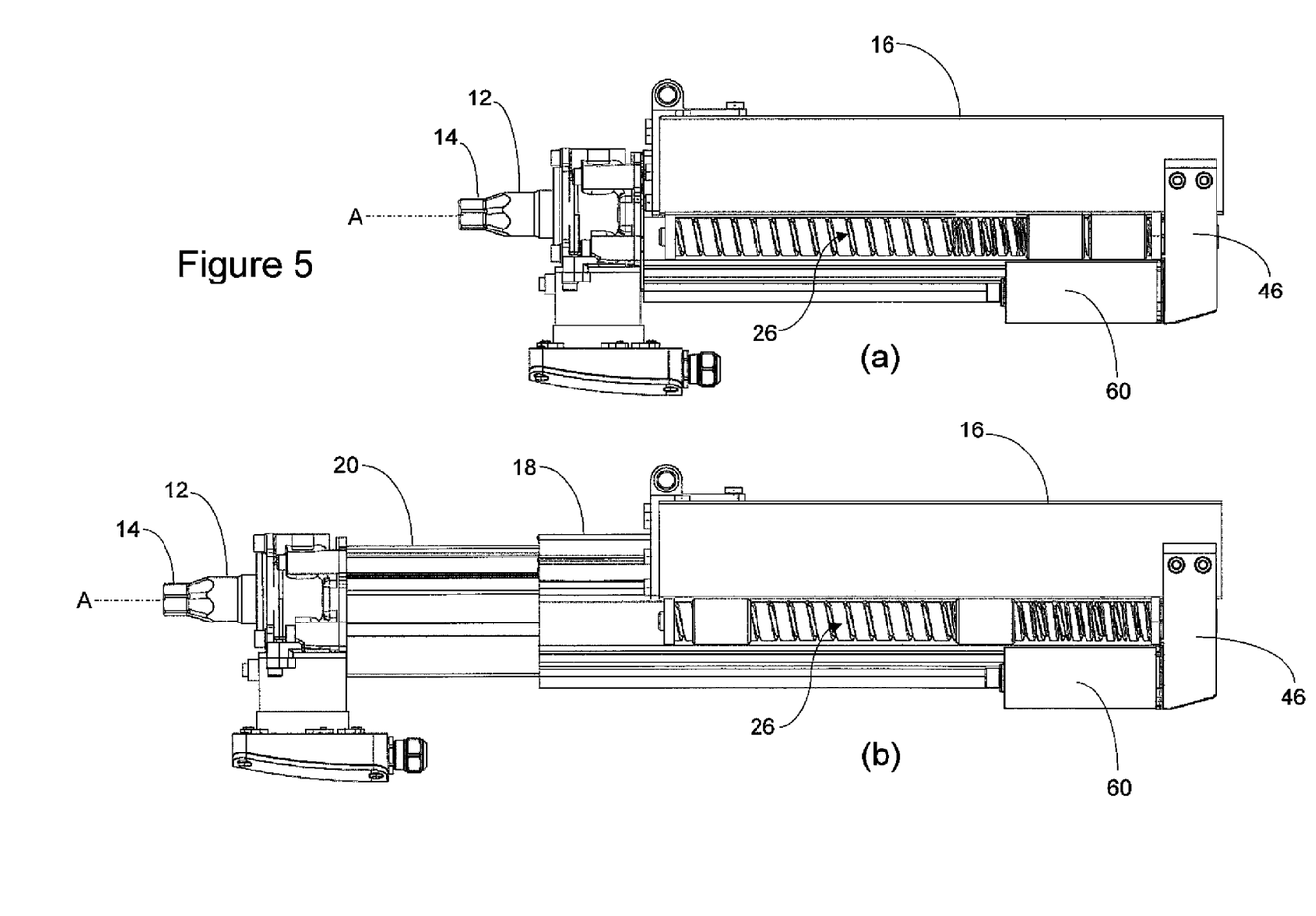

The telescopic steering column assembly 10 comprises an outermost elongate housing portion ("tube") 16 which slidably and telescopically receives an intermediate elongate housing portion ("tube") 18 which in turn slidably and telescopically receives an innermost elongate housing portion ("tube") 20. In use, the outermost elongate tube 16 is secured to the vehicle into which the steering column assembly 10 is to be installed (e.g. to a cross bar beam of the vehicle). The elongate steering column 12 is rotatably mounted within the innermost elongate tube 20 and the relative positions of the outermost, intermediate and innermost tubes 16, 18, 20—and therefore the position of a steering wheel attached to the end 14 of the steering column 12—can be adjusted by displacing the tubes with respect to one another along the axis A-A, as will be explained. A steering column turns a sensor. The sensor and a torque feedback motor (not visible) are mounted to the steering column 12 near its inner end within the innermost tube 20, to measure a rotational position of the steering column 12 and to provide a feedback force to the driver in order to provide a sensation of "road feel".

The mechanism 24 for displacing the outermost, intermediate and innermost tubes 16, 18, 20 is shown in more detail in FIGS. 3 to 6. The mechanism comprises an elongate, straight leadscrew 26 having a front end 28 and a rear end 30 and whose exterior is provided with a helical screw thread. Annular, resiliently deformable front and rear end stops 34, 36 (e.g. made from rubber) are mounted at the front and rear ends 28, 30 respectively of the leadscrew and the rear end 30 of the lead screw is rotatably mounted in a tubular recess 36 of a gearbox housing 38.

The leadscrew 26 has a first helically threaded portion 26a extending from the front end 28 having threads of a first pitch and a second helically threaded portion 26b extending from the rear end 30 having threads of a second pitch different from that of the first pitch, but threaded in the same direction as each other. As shown in the figures, the threaded portion 26a extends along the whole length of the threaded portion of the leadscrew 26 while the second threaded portion 26b extends from the rear end 30 to approximately the midpoint of the leadscrew 26, so that the first and second portions 26a, 26b overlap for part of the length L of the leadscrew (which in this exemplary arrangement corresponds to the length of the second threaded portion 26b).

A first displacement member in the form of an internally threaded sleeve or collar 42 (commonly referred to as a "nut") is screw-threadedly mounted on the first helically screw threaded portion 26a and has a laterally extending lug 44 which passes through a longitudinally extending slot (not visible) in the side of the intermediate tube 18, and by which the threaded sleeve is attached to the innermost tube 20. The gearbox housing 38 is attached to a mounting plate 46 which in turn is securely attached to the outer tube 16 by means of two securing bolts 48.

A second displacement member, also in the form of an internally threaded sleeve or collar 50 (commonly referred to as a "nut") is screw-threadedly mounted on the second helically screw threaded portion 26b and has a laterally extending lug 52 by means of which the sleeve is attached to the intermediate tube 18.

An electric motor 60 is secured to the gearbox housing 38 and is arranged to rotate the leadscrew 26 via the gearbox 38, as will be explained. In one exemplary arrangement, the gearbox housing 38 has a honeycomb structure to reduce its weight and the amount of material required and to improve cooling.

As mentioned previously, (a) the threaded sleeve 42 which is screw-readily mounted on the first helically threaded portion 26a of the leadscrew 26 is secured to the innermost tube 20, (b) the threaded sleeve 50 which is screw-threadedly mounted on the second helically threaded portion 26b of the leadscrew 26 is secured to the intermediate tube 18 and (c) the gearbox 38 is secured to the outer tube 20. Consequently, as the motor 60 is operated in a first direction, the threaded sleeves 42, 50 move along the leadscrew 26 towards the end stop 34 at the front end of the leadscrew, to a maximum extended displacement as illustrated in FIG. 5(b) in which the sleeve 42 abuts the front end stop 34. The pitches of the first and second threaded portions 26a and 26b are different from one another, so that the threaded sleeves 42, 50 move at different speeds and move through different distances for the same rotation of the leadscrew 26.

Conversely, as the motor 60 is operated in the opposite direction, the threaded sleeves 42, 50 move along the leadscrew 26 in the opposite direction away from the end stop 34 towards the end stop 36, to a minimum withdrawn displacement as illustrated in FIG. 5(a) in which the sleeve 50 abuts the rear ends stop 36. The outermost tube 16 is secured to the vehicle, and therefore operation of the motor 60 causes the intermediate tube 18 to telescope in and out of the outermost tube 16 and simultaneously causes the innermost tube 20 to telescope in and out of the intermediate tube 18, between a maximum withdrawn condition in which the mechanism 24 assumes the configuration of FIG. 5(a) and a maximum extended condition in which the mechanism 24 assumes the condition of FIG. 5(b). As seen in FIG. 5(a), by superimposing the first threaded portion 26a of the leadscrew on the second threaded portion 26b of the leadscrew, so that the first and second threaded portions overlap, the first threaded sleeve 42 attached to the innermost tube 20 can be displaced along the leadscrew to a position adjacent to the second threaded sleeve 50 when the mechanism 24 is in its maximum withdrawn condition (FIG. 5(a)).

The position of the steering column 12, and therefore of the steering wheel which is connected to the steering column 12 in use, can be adjusted between a withdrawn, stowed position (suitable for autonomous operation of the vehicle) and an extended, deployed condition (suitable for manual control of the vehicle). The position of the steering wheel in the extended, deployed condition can also be adjusted to suit the driver of the vehicle stop FIG. 2 also shows that a much smaller packaging space (indicated at A) is required by the actuating mechanism 24, as compared with the packaging space (indicated at B) required by a typical prior art actuating mechanism.

The use of a single leadscrew 26 to which the first and second displacement members 42, 50 are screw-readily mounted also results in reduced bending of the mechanism during the crash, as the mechanism lies in one axis. In addition, the compact nature of the adjusting mechanism results in smaller lateral distance between the leadscrew 26 on the mounting points of the outer, intermediate and inner tubes 16, 18, 20, resulting in a lower bending moment in the event of a crash, as compared with prior art arrangements.

In addition, the use of a single leadscrew 26 having first and second threaded portions 26a, 26b which overlap over at least part of the length of the leadscrew 26 results in a larger displacement for the same length of leadscrew or, alternatively, allows a smaller leadscrew to be used to achieve the same displacement.

Figure 6:
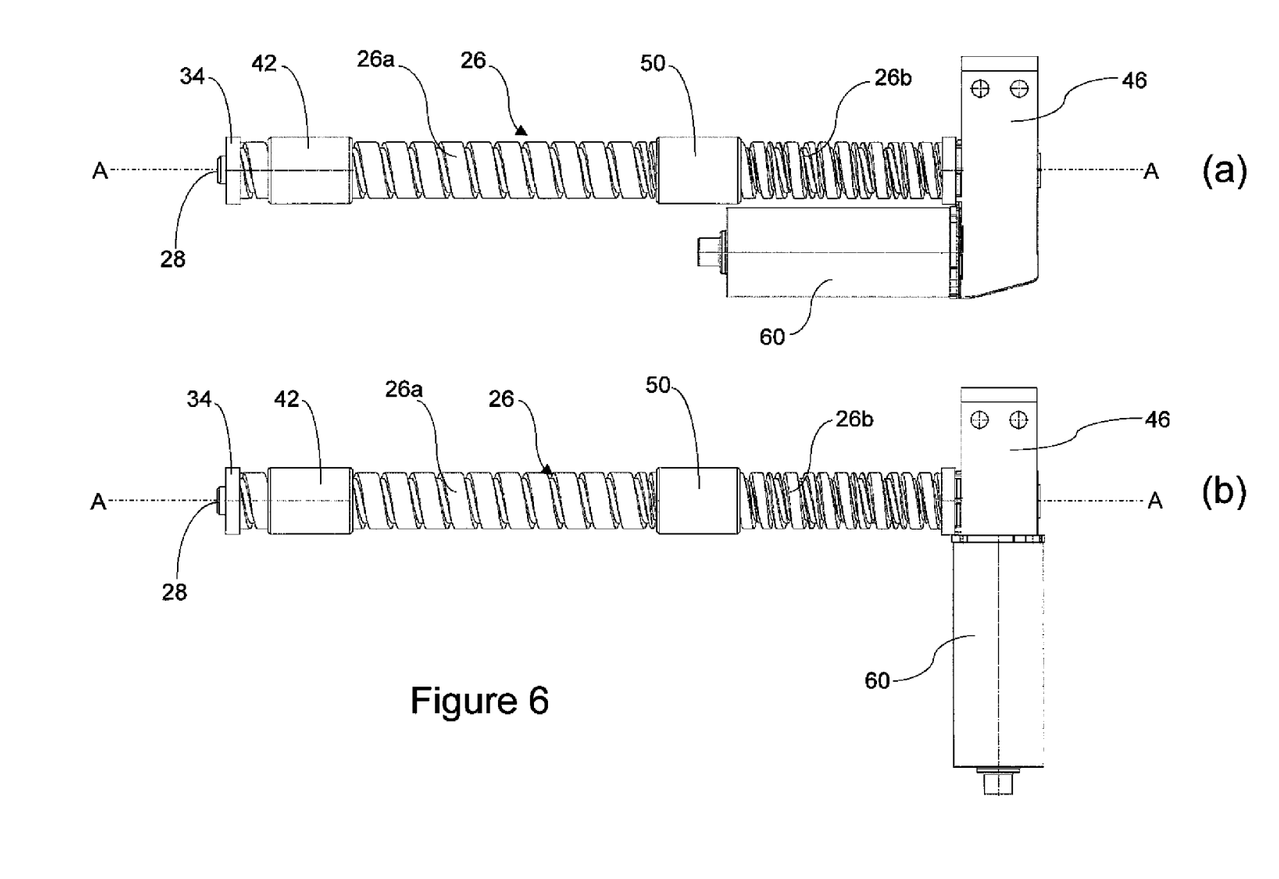

The arrangements illustrated in FIGS. 6(*a*) and (*b*) show variations of the exemplary arrangement of FIG. 1, having different orientations of the motor 60. The arrangement shown in FIG. 6(*a*) is identical to the arrangement of FIG. 1, with the rotational axis of the motor parallel to the longitudinal axis A-A of the leadscrew 26. In FIG. 6(*b*), the longitudinal axis of the motor 60 is perpendicular to the longitudinal axis A-A of the leadscrew 26 and extends downwardly. Other configurations are also possible. The different possible positions of the motor 60 allow flexibility in positioning the column assembly 10 within the available packaging space within a vehicle.

Figure 7:
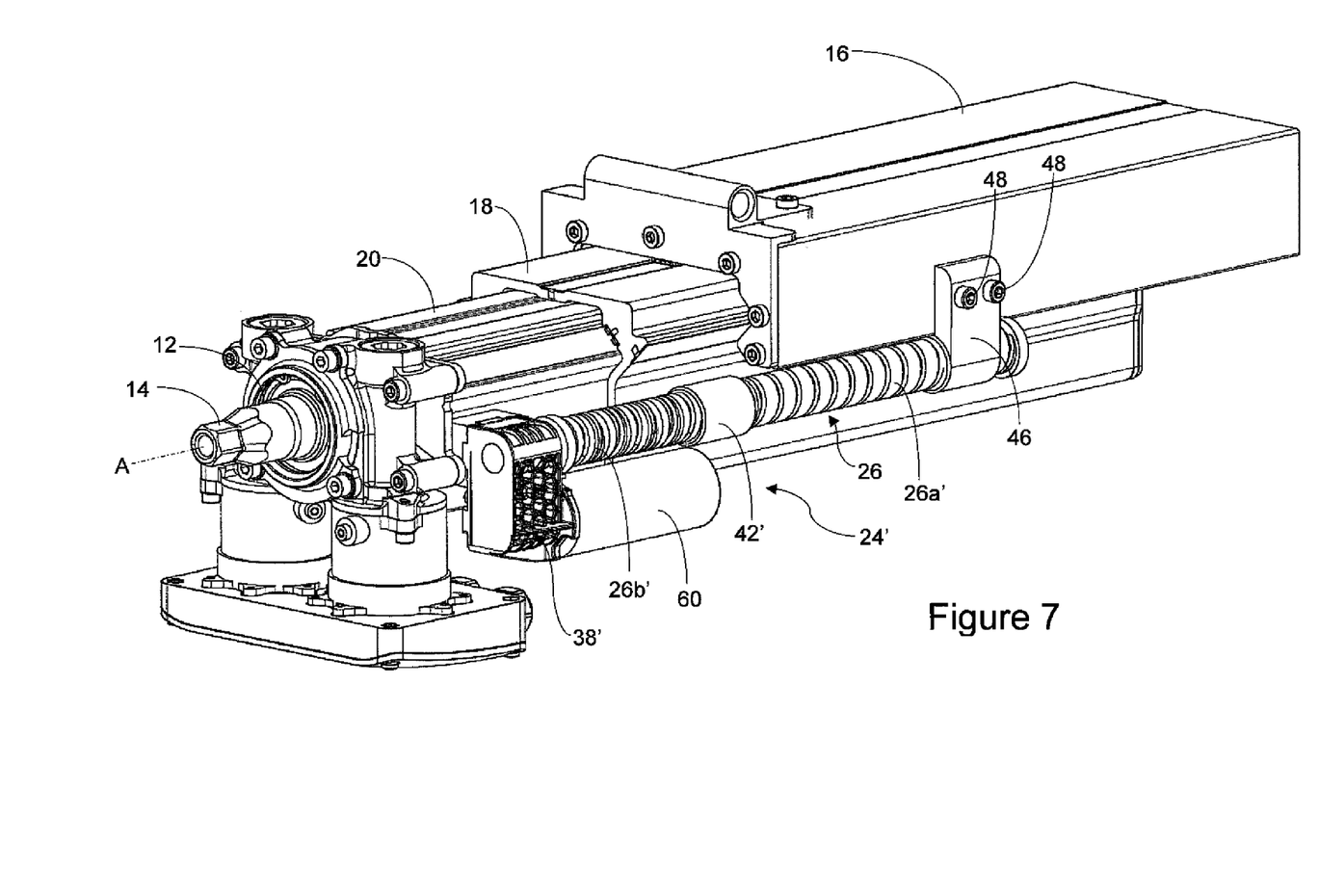
FIG. 7 is a perspective view of the adjustment mechanism of a second exemplary arrangement of a steering column assembly for a vehicle in accordance with the present disclosure, which is a variation of the first exemplary arrangement.

A second exemplary arrangement of the present disclosure is illustrated in FIG. 7. The construction of this exemplary arrangement is very similar to that of the first exemplary arrangement and the same reference numerals as used for the first exemplary arrangement are used to denote corresponding features. The features which are modified with respect to the first exemplary arrangement are given the same reference numeral but with the addition of a prime (').

The only significant differences as compared with the first exemplary arrangement are that (a) the actuating mechanism 24' is rotated 180° as compared with the actuating mechanism 24 of the first exemplary arrangement, so that the motor housing 38' with its associated motor 60 are mounted on the innermost tube 20 and the first threaded sleeve 42' which is threadedly mounted on the first threaded portion 26*a*' is secured to the outermost tube 16 by two bolts 48' passing through a mounting plate 46' and (b) the second threaded sleeve 50' which is threadedly mounted on the second threaded portion 26*b*' is secured to the intermediate tube 18.

However, operation of the motor 60 results in the same adjustment of the relative positions of the outer, intermediate and inner tubes 16, 18, 20 as described for the first exemplary arrangement.

The disclosure is not restricted to the details of the foregoing exemplary arrangements.

For example, in the exemplary arrangements described, the first threaded portion 26*a*/26*a*' extends over the whole length of the leadscrew 26. However, the first threaded portion 26*a*/26*a*' may instead only extend over part of the length of the leadscrew 26, so that the leadscrew 26 comprises end portions having only the first threaded portion 26*a*/26*a*' and the second threaded portion 26*b*/26*b*' respectively and an intermediate portion in which the first and second threaded portions overlap.

The invention claimed is:

1. A steering column assembly comprising:
   a housing having outer, intermediate, and inner elongate, telescopically mounted housing portions movable relative to one another along an adjustment axis;
   a steering column rotatably mounted in the inner elongate housing portion and being configured at one end for attachment of a steering member;
   a leadscrew rotatably mounted on the intermediate housing portion and having first and second threaded portions, the first threaded portion comprising threads of a first pitch and the second threaded portion having threads of a second pitch;
   a motor for rotating the leadscrew;
   a first displacement member screw-threadedly mounted to the first threaded portion of the leadscrew and connected to one of the outer and inner elongate housing portions; and
   a second displacement member screw-threadedly mounted to the second threaded portion of the leadscrew and connected to the intermediate housing portion;
   wherein rotation of the leadscrew causes displacement of the first and second displacement members along the adjustment axis,
   wherein the first threaded portion of the leadscrew extends over a length of the leadscrew, wherein the second threaded portion of the leadscrew extends from one end of the leadscrew to a midpoint of the leadscrew.

2. A steering column assembly as claimed in claim 1, wherein the first and second threaded portions are threaded in the same direction.

3. A steering column assembly as claimed in claim 2, wherein the first threaded portion of the leadscrew extends over substantially a whole length of the leadscrew.

4. A steering column assembly as claimed in claim 1, wherein the first displacement member comprises a first internally threaded member mounted on the first threaded portion of the leadscrew.

5. A steering column assembly as claimed in claim 4, wherein the second displacement member comprises a second internally threaded member mounted on the second threaded portion of the leadscrew.

6. A steering column assembly as claimed claim 5, wherein the motor is mounted to move with the same housing portion on which the leadscrew is rotatably mounted.

7. A steering column assembly as claimed in claim 6, further comprising a gear arrangement connecting an output of the motor to the leadscrew.

8. A steering column as claimed in claim 7, wherein the leadscrew is rotatably mounted on the outer housing portion.

9. A steering column assembly as claimed in claim 1, wherein the second displacement member comprises a second internally threaded member mounted on the second threaded portion of the leadscrew.

10. A steering column assembly as claimed in claim 1, wherein the motor is mounted to move with the same housing portion on which the leadscrew is rotatably mounted.

11. A steering column assembly as claimed in claim 1, further comprising a gear arrangement connecting an output of the motor to the leadscrew.

12. A steering column assembly as claimed in claim 11, wherein the motor is connected to the gear arrangement and the gear arrangement is connected to the outer or inner elongate housing portion.

13. A steering column as claimed in claim 1, wherein the leadscrew is rotatably mounted on the outer housing portion.

14. A steering column assembly as claimed in claim 1 were in the leadscrew is rotatably mounted on the inner housing portion.

15. A steering column assembly as claimed in claim 1, wherein the leadscrew extends substantially parallel to the adjustment axis of the telescopic housing.

16. A steering column assembly as claimed in claim 1, further comprising a securing mechanism for securing the outer housing portion to a vehicle.

17. A vehicle comprising a steering column assembly as claimed in claim 1.

\* \* \* \* \*